United States Patent [19]

White-Stevens

[11] Patent Number: 5,507,958
[45] Date of Patent: Apr. 16, 1996

[54] DEHYDRATION OF HEAVY CRUDE USING HYDROCYCLONES

[75] Inventor: Derek T. White-Stevens, Fairview, Tex.

[73] Assignee: Atlantic Richfield Company, Los Angeles, Calif.

[21] Appl. No.: 391,302

[22] Filed: Feb. 21, 1995

Related U.S. Application Data

[63] Continuation of Ser. No. 101,154, Aug. 2, 1993, abandoned.

[51] Int. Cl.[6] .................................................. B01D 17/038
[52] U.S. Cl. .......................... 210/774; 210/788; 210/800; 210/805; 210/806; 208/187
[58] Field of Search .................................. 210/774, 787, 210/788, 800, 805, 806; 208/187

[56] References Cited

U.S. PATENT DOCUMENTS

| | | | |
|---|---|---|---|
| 2,816,659 | 12/1957 | Deemter et al. | 210/788 |
| 3,582,489 | 6/1971 | Meadow et al. | 204/190 |
| 4,948,393 | 8/1990 | Hodson et al. | 55/40 |
| 5,021,165 | 6/1991 | Kalnins | 210/703 |
| 5,037,558 | 8/1991 | Kalnins | 210/702 |
| 5,055,202 | 10/1991 | Carroll et al. | 210/787 |
| 5,203,294 | 4/1994 | Schubert et al. | 210/788 |

FOREIGN PATENT DOCUMENTS

| | | |
|---|---|---|
| 2233577 | 1/1991 | United Kingdom. |
| 2258167 | 2/1993 | United Kingdom. |
| WO92/19347 | 11/1992 | WIPO ................................ 210/787 |

*Primary Examiner*—Matthew O. Savage
*Attorney, Agent, or Firm*—Drude Faulconer

[57] ABSTRACT

A method for dehydrating a liquid/liquid production stream which is comprised of a heavy crude oil (i.e. about 30° A.P.I. or less) and water which originally forms a water-in-oil emulsion wherein hydrocyclone is used as a primary separator to separate substantial amounts of the water from the stream. The stream is first treated without chemicals to sustantially alter of its characteristics by either (a) heating the stream to substantially reduce the viscosity of the heavy crude therein and/or (b) inverting the emulsion in the stream to an oil-in-water emulsion. Once the characteristics of the stream are so altered, the stream is passed through the primary hydrocyclone to separate out a significant amount (e.g. about 50% or more) of the water. The stream is then passed either to a second hydrocyclone or a stablization tower to separate additional water from the oil and bring it within shipping and/or sale specifications.

13 Claims, 5 Drawing Sheets

5,507,958

DEHYDRATION OF HEAVY CRUDE USING HYDROCYCLONES

This is a continuation, of application Ser. No. 08/101,154 filed Aug. 2, 1993, now abandoned.

DESCRIPTION

1. Technical Field

The present invention relates to method and a system for dehydrating heavy crude oil which uses hydrocyclones and in one of its aspects relates to a method and system for reducing the water content of a heavy crude oil (i.e. density equal to or less than 30° API) production stream by first treating the stream to substantially alter its characteristics and then passing the stream through at least one hydrocyclone.

2. Background Art

In producing crude oil from subterranean formations, substantial amounts of water (e.g. up to 30% or more) are routinely produced as part of the production stream. This dictates that the production stream must be processed in the field to reduce the water content of the crude oil to prescribed levels (e.g. less than 3% water) before the crude oil can be sold and/or shipped by pipeline. Where the crude oil being produced is that which is commonly known as "heavy crude" (i.e. a crude having a density of about 30° API or less), adequate dehydration of the crude is both time consuming and extremely expensive in capital outlays and continuing operating costs.

That is, known systems currently used for dehydrating heavy crudes must include free-water knockout vessels, gravity separators, and/or heater treaters and wash tanks. Such systems often rely on heat, chemicals, electrical potentials, and/or long retention times in the various vessels to cause gravity separation of the water and oil phases. As will be recognized by those skilled in this art, the design and installation of such systems involves substantial capital outlays which seriously affect the overall economics in producing heavy crudes.

A hydrocyclone is a separator which is designed to impart a swirling or cyclonic motion to a liquid/liquid stream as the stream flows through the hydrocyclone. This motion forces the denser or heavier component (e.g. water) outward against the separator wall while squeezing the less dense or lighter component (e.g. oil) from its midst to a lower pressure, central core or vortex. Generally speaking, the less dense or lighter component (e.g. oil) is taken off through a small, centered top outlet or "overflow" while the more dense or heavier component (e.g. water) is taken off through a bottom outlet or "underflow".

Liquid/liquid hydrocyclones have previously been used in the processing of production streams but heretofore have been primarily limited to the desanding, deoiling, and the polishing of the produced water streams after the majority of oil has been separated from the produced water. That is, a produced water stream which has been processed to remove substantially all of the oil therefrom is then further processed through a hydrocyclone(s) to remove most of any remaining oil contaminant (e.g. about 200 ppms oil) and sand before the water is ecologically disposed of; for example, see U.S. Pat. Nos. 5,021,165 and 5,037,558.

Unfortunately, however, it has been found that the high viscosities of heavy crudes at ambient temperatures and the water-in-oil emulsions which exist in most, if not all, heavy crude production streams greatly inhibit the separation of the discontinuous water phase from the continuous heavy crude oil phase in a hydrocyclone.

More specifically, it has been found in tests conducted with varying concentrations of water in oil (e.g. 70% heavy crude oil and 30% water) and without emulsion-breaking chemicals, that very little of the water (e.g. a maximum of less than 2%) can be separated from the heavy crude oil in a bench top centrifuge when subjected to a force of over 600 g's. Even with emulsion-breaking chemicals, only approximately 25% of the water could be removed. Of course, the exact amount of water which can be removed from a production stream depends on the physical properties and basic composition of the particular heavy crude oil being produced but the test results clearly indicate that a conventional, single stage hydrocyclone, by itself, would be inadequate to dehydrate heavy crudes to any substantial extent at normal operating temperatures, i.e. expected wellhead temperatures.

DISCLOSURE OF THE INVENTION

The present invention provides a method for dehydrating a liquid/liquid production stream which is comprised of a heavy crude oil having a density equal to about 30° A.P.I. or less and water which forms an emulsion wherein said heavy crude oil is originally the continuous phase and the water is the discontinuous phase. In accordance with the present invention, the processing time and the amount of equipment and operating expense are significantly reduced in dehydrating the heavy crude in that the present invention allows the use of a single stage hydrocyclone as a primary separator to separate substantial amounts of the water from the stream during a single pass through the hydrocyclone.

More specifically, a heavy crude production stream is first treated without chemicals to sustantially alter its characteristics by either heating the stream to substantially reduce the viscosity of the heavy crude (e.g. from about 200 to about 10 centipoises or less) and/or inverting the naturally-occurring, water-in-oil emulsion in the stream by making the water the continuous phase of the emulsion. In inverting the emulsion, sufficient water is added (preferably by diffusing the production stream into the additional water) to reverse the continuous and discontinuous phases. Once the characteristics of the stream are so altered, the stream is passed through a primary hydrocyclone to separate out a significant amount of the water (e.g. about 50% or more by volume of the water).

While the amount of water in the production stream is significantly reduced by the primary hydrocyclone, normally a substantial amount of water will remain in the oil stream after passing through the primary hydrocyclone. The stream is then passed either to a second hydrocyclone or a stablization tower to separate additional water from the oil and bring it within shipping and/or sale specifications (e.g. about 3% water or less). Where the stream is treated by inverting the emulsion in the stream, at least part the water used to invert the emulsion may be water which has been previously removed from the stream during the dehydration process.

BRIEF DESCRIPTION OF THE DRAWINGS

The actual construction, operation, and apparent advantages of the present invention will be better understood by referring to the drawings in which like numerals identify like parts and in which.

BEST KNOWN MODE FOR CARRYING OUT THE INVENTION

Figure 1:
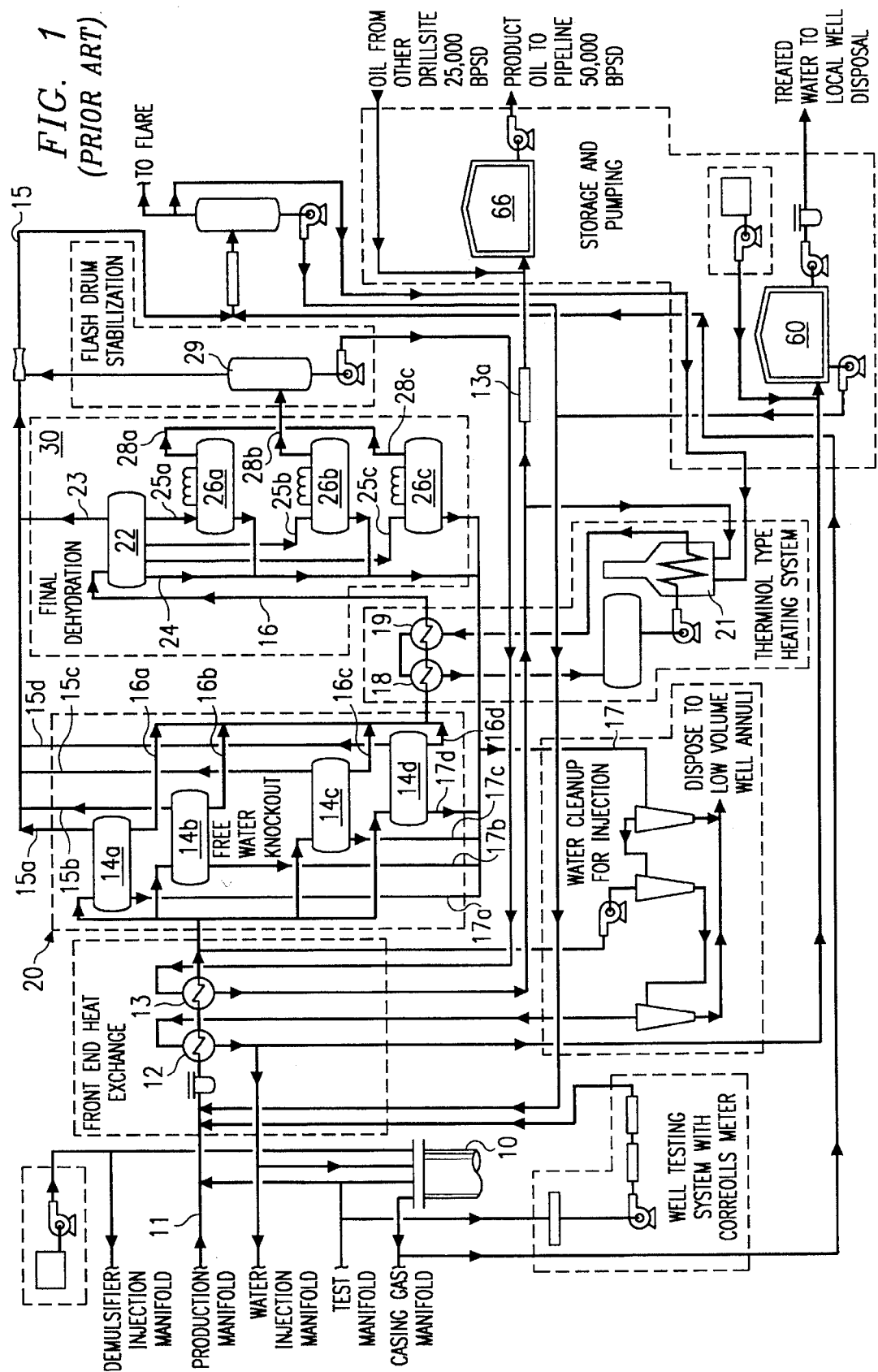
FIG. 1 is a schematical flow diagram of a typical prior art process which has been used for dehydrating a heavy crude oil production stream.

Referring more particularly to the drawings, FIG. 1 illustrates a typical prior art process of the type presently used for dehydrating a heavy crude oil stream in the field. "Heavy crude oil", as used herein, shall mean a crude oil which has a density of about 30° A.P.I. or less. As will be understood in the art, "degrees A.P.I." is a standard, originated by the American Petroleum Institute, which has been universally accepted by the industry for designating the density of a particular oil. Briefly, ° A.P.I. can be defined as follows:

°A.P.I. at 60° F. =

$$\left( \frac{141.1}{\text{Sp. gravity of oil to water at } 60° \text{ F.}} \right) - 131.5$$

In FIG. 1, a heavy oil stream is produced from a subterranean formation through well(s) 10. "Production stream" as used herein is meant to denote a stream which is comprised of heavy crude and substantial amounts of water (e.g. more than 3%) and may contain gas and particulate material (e.g. sand) as well. As will be recognized, the production stream must be processed to dehydrated the crude oil to reduce its water content to a prescribed level (e.g. about 2% or less) before the crude oil can be sold or pipelined to market.

The production stream of FIG. 1 is flowed through heat exchangers 12, 13 in line 11 to heat the stream before it is delivered to the primary dehydration section 20 which, in turn, is shown as being comprised of a plurality of "free water knockouts" 14a–14d connected for parallel flow. Knockout vessels 14 may be any of several well known, commercially-available gravity-type separators which, in turn, may include means for adding chemicals (e.g. emulsion breakers) thereto. The stream remains in the respective vessels 14 for a residence time to allow the gas, oil, water, and solid phases of the stream to separate as much as is practical under the conditions with the gas being removed overhead through respective lines 15a–15d and the solids removed from the bottom (not shown).

The separated oil and its remaining water contaminant (i.e. heavy crude oil) is removed from vessels 14 through respective lines 16a while the water with its remaining or residual oil contaminant (i.e. water) is removed from the vessels 14 through respective lines 17a. The heavy crude oil stream is collected into common line 16 and is further heated by flowing the stream through heat exchangers 18, 19, which, in turn are exchanged with fluid heated by a fired heater 21, boiler, or the like. The heavy crude oil stream then flows into the secondary separation section 30 which is shown as being comprised of a gravity-type separator/distributor 22 which further separates the stream with gas being taken off through line 23 and water being taken off through line 24.

The crude oil and any remaining water contaminant from separator 22 is fed in parallel through a plurality of sophisticated treaters 26a–26c through lines 25a–25c, respectively. The final dehydration of the heavy crude which brings it to within pipeline and/or sales specs (e.g. about 3% water or less) normally requires that the treaters 26a–26c be of a type which is relatively expensive to install and operate, e.g. electrostatic treaters which use an electrostatic field to break difficult emulsions such as those which normally are associated with heavy crude and water streams. The crude oil from treaters 26a–26c is removed through respective lines 28a–28c, passed through a flash drum 29 or the like to remove any remaining gas, and is then cooled in heat exchanger 13 and cooler 13a before it is placed in storage tank 66 or supplied to a pipeline (not shown).

While the known process and system of FIG. 1 works well to dehydrate a heavy crude oil production stream, it requires substantial equipment and capital outlays and processing time which detract from the overall economics of dehydrating heavy crude streams. In accordance with the present invention, the processing time and the amount of equipment and operating expense are significantly reduced in accomplishing the same result.

Figure 2:
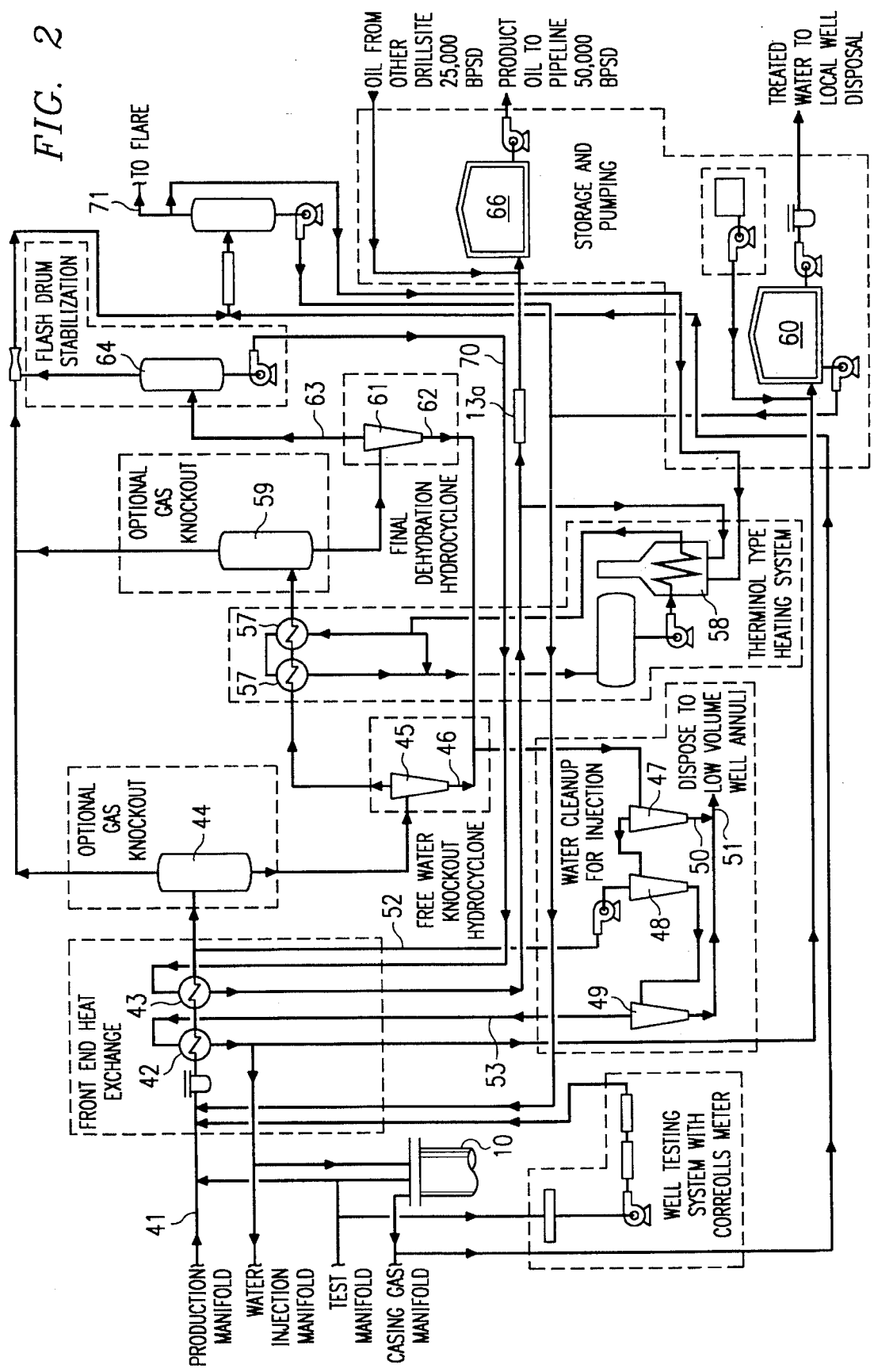
FIG. 2 is a schematical flow diagram of a process in accordance with the present invention wherein a hydrocyclone is used in the initial stages of the dehydration of a heavy crude oil production stream.
Figure 3:
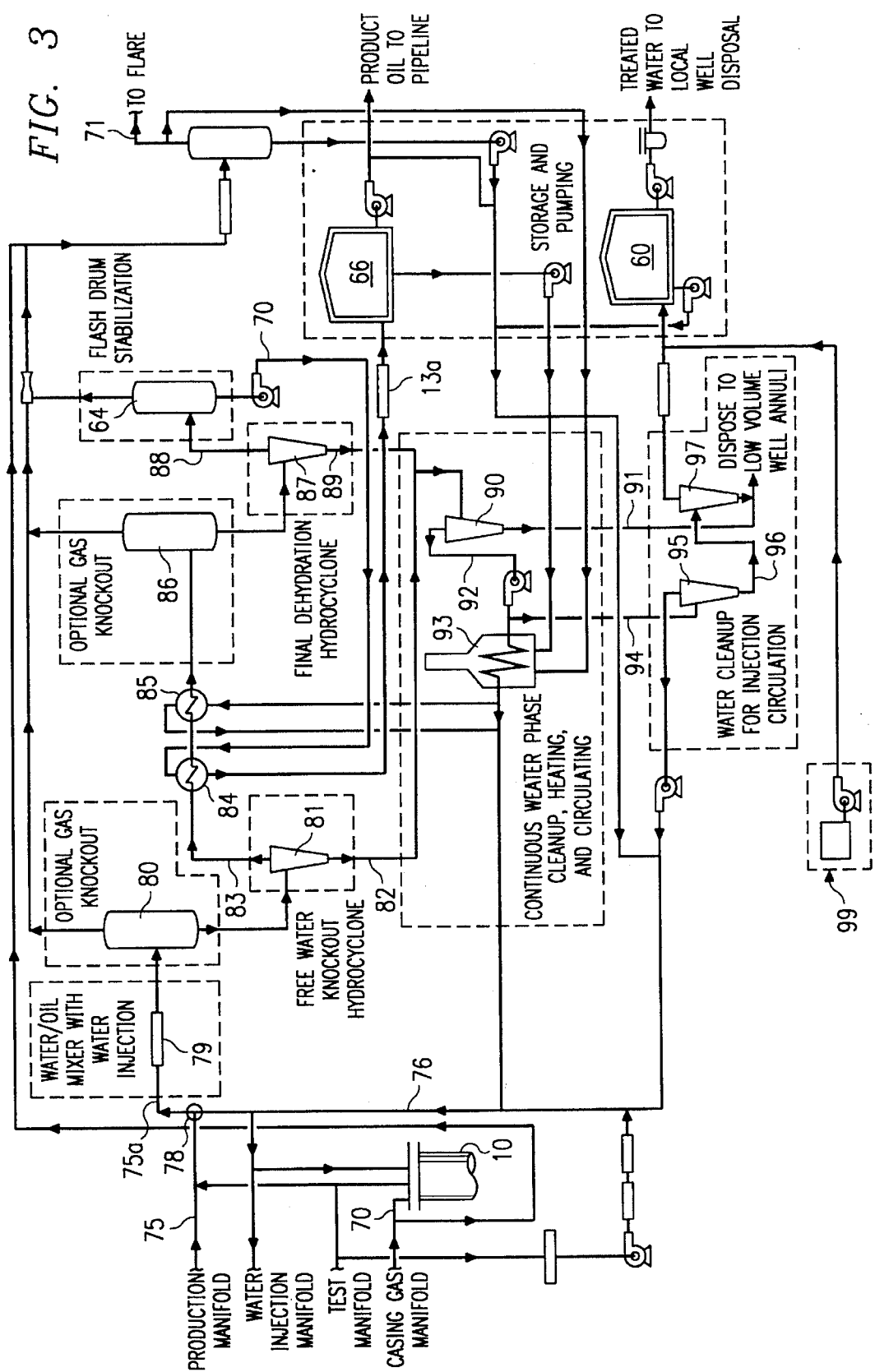
FIG. 3 is a schematical flow diagram of another embodiment of a process in accordance with the present invention wherein a hydrocyclone is used in the initial stages of the dehydration of a heavy crude oil production stream.
Figure 4:
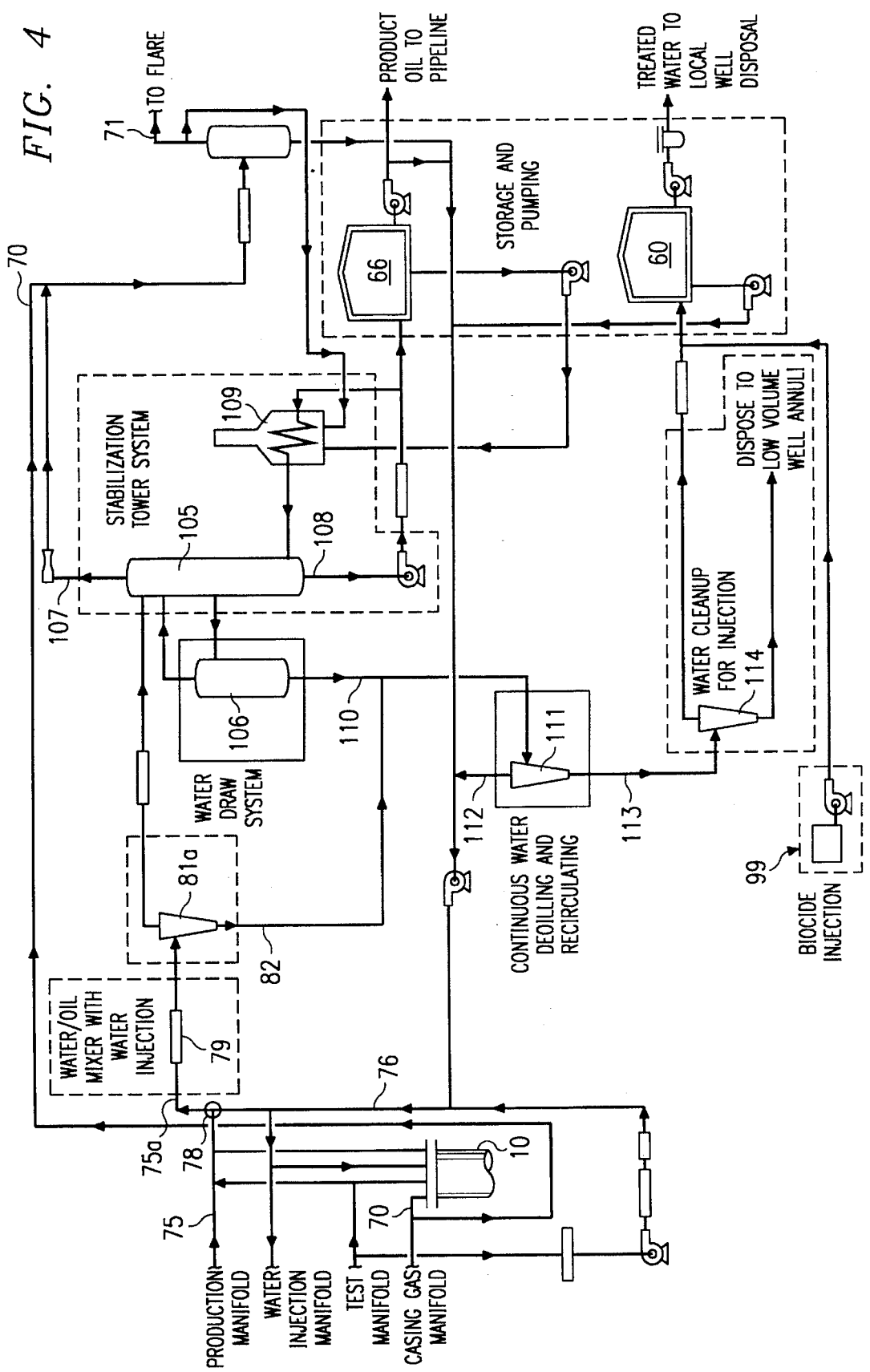
FIG. 4 is a schematical flow diagram of still another embodiment of a process in accordance with the present invention wherein a hydrocyclone is used in the initial stages of the dehydration of a heavy crude oil production stream.

Referring now to FIGS. 2–4, it can be seen that both the relatively expensive, primary separation section 20 and the secondary separation section 30 of the prior art process of FIG. 1 have been effectively replaced by simple, economical hydrocylones. While only one hydrocyclone is illustrated at each respective location in the various flow diagrams and will be referred to only in the singular, it should be recognized that each illustrated hydrocyclone may, in fact, actually represent a plurality of small hydrocyclones connected for parallel flow at that location depending on the volume of flow to be processed and the force level required to effect the desired oil/water separation for the crude oil properties involved.

Hydrocyclones are well known for separating the phases of a liquid/liquid stream but have heretofore been inadequate to effect any meaningful separation of water from a heavy crude oil stream. The reason why hydrocyclones have previously been unsuccessful is believed to be due to certain original characteristics of a typical heavy crude oil stream; i.e. (1) the density differences between the phases is too small and the viscosity of the heavy crude is too great to be readily separated in a hydrocyclone; and (2) the liquid/liquid stream exists as a water-in-oil emulsion wherein the oil is the continuous phase and the water is the discontinuous phase which makes any meaningful separation in the hydrocyclone unobtainable at expected, operational temperatures.

The efficiency of known hydrocyclones in liquid/liquid separation is governed by the following equation:

$$\text{Hydrocyclone efficiency} = k \left( \frac{(\rho_H - \rho_L)^\alpha D^2}{\mu^\beta \gamma^\kappa \Theta} \right)$$

where:
  k=proportionality constant
  $\rho_H$=density of heavier liquid $\rho_L$=density of lighter liquid
D=droplet diameter of dispersed phase
$\mu$=viscosity of continuous phase liquid
Y=interfacial tension
$\Theta$=concentration of light/heavy separation
$\alpha,\beta,\chi$=exponential correlations for specific fluids From the above relationship, it is evident that if the droplet size is assumed to be fixed at the inlet of the hydrocyclone, the governing variables become the density difference between the two liquid phases and the viscosity of the continuous liquid phase. The density difference between the oil and the water will not vary except as a function of composition of the oil and as a function of temperature. The density of the crude oil may decrease at a substantially greater rate than that of water as the temperature of the emulsion is raised. An additional benefit of heating is that it reduces the viscosity of the continuous phase which effectively enhances the mobility of the dispersed phase (i.e. discontinuous phase) within the continuous phase.

Further, the viscosity of the water-oil emulsion can be favorably changed by converting the continuous oil phase emulsion into a continuous water phase emulsion so that the viscosity of continuous phase is changed from the heavy viscosity of the crude to the lighter viscosity of the water.

In accordance with the present invention, it is possible to use a hydrocyclone as a primary separator in dehydrating a heavy crude oil, liquid/liquid stream due to the fact that the stream is first treated to substantially alter its characteristics before the stream is passed through the primary hydrocyclone so that commercially-available hydrocyclones become capable of separating a significant amount of the water from the oil during a single pass through the hydrocyclone.

The stream is treated to alter its characteristics by either heating the stream to substantially reduce the viscosity of the heavy crude (e.g. from about 200 to about 10 centipoises or less) and/or inverting the naturally-occurring emulsion in the stream by making the water the continuous phase of the emulsion.

Referring again to FIG. 2, a process is illustrated wherein the characteristics of a heavy crude oil stream is altered by heating the stream to reduce the viscosity of the heavy crude oil prior to passing the stream through a primary hydrocyclone. The liquid/liquid stream is produced from well(s) 10 through production manifold or line 41. The stream is passed through heat exchangers 42, 43 where the stream is heated to a temperature (e.g. 210°–250° F.) at which the differences in densities between phases is such to allow good separation in the hydrocyclone and the viscosity of the crude oil phase is reduced to a relatively low value (e.g. about 10 centipoises or less). The heated stream is then passed through an gas separator 44 (may be optional depending on gas content of the stream) and into primary hydrocyclone 45.

Hydrocyclone 45 is operated at a split ratio to maximize the amount of water which will be separated from the stream and removed through the underflow 46 of the hydrocyclone. This "water" will normally still contain small amounts of oil as a contaminant depending on the actual split ratio of the hydrocyclone. The underflow is then passed through a de-sander hydrocyclone 47 to remove sand and then through de-oiler hydrocyclones 48 to further reduce any oil in the water. All oil recovered from the overflow 52 of de-oiler hydrocyclone 48 is pumped back into the production stream in line 41 and recycled to extinction. The overflow 53 of polishing hydrocyclone 49, now being substantially water, is passed through heat exchanger 42 for heat recovery before the overflow is passed to produced water tank 60 while the underflows of hydrocyclones 47 and 49 are disposed of through line 51.

The overflow 56 from primary hydrocyclone 45 is comprised of heavy crude oil having a significantly reduced but still substantial water contaminant remaining therein. While the amount of water in the production stream has been significantly reduced by primary hydrocyclone 45, there will normally still be a substantial amount of water remaining. For example, a typical, commercially-available hydrocyclone 45 is normally capable of reducing the water content of the heated and altered production stream by as much as 50% or more. That is, a stream having 20% water by volume can be reduced to 10% or less water by volume in a single pass through primary hydrocyclone 45.

The stream in overflow 56 is heated further by passing it through heat exchanger(s) 57 which, in turn, utilizes heat supplied by heater 58 (e.g. boilers, furnaces, etc.). The stream flows from the heat exchanger(s) 57, through a gas knockout vessel 59 (also may be optional) and into a secondary hydrocyclone 61 where the liquid/liquid stream is further separated. Hydrocyclone 61 is operated at a split ratio which minimizes the amount of water in overflow 63. The underflow 62 of hydrocyclone 61 (i.e. water with small amount of oil contaminant) is combined with underflow 46 of primary hydrocyclone 45 and is passed therewith through de-sander 47 and de-oiler hydrocyclones 48, and polishing hydrocyclone 49 as described above.

The overflow 63 of secondary hydrocyclone 61 (e.g. crude oil meeting pipeline and/or sales specs—less than about 3% water—) is passed through flash drum stablizer 64 or the like to remove any substantial remaining gas before it is cooled by passing the crude oil product through line 70, through heat exchanger 43 and cooler 13a, and on to product tank 66 or other storage or transporation. Gas is collected from (a) casing gas manifold 70, (b) gas knockouts 44, 59, (c) flash drum 64 and is disposed by any acceptable means, e.g. flare 71, fuel for burner 58, etc. By adequately preheating the production stream, hydrocyclones can be used as both the primary and secondary means for dehydrating the crude thereby eliminating the need for the more expensive, conventional equipment previously required in the process of FIG. 1.

Turning now to the embodiment of the present invention illustrated in FIG. 3. a heavy crude oil production stream is treated to significantly alter its characteristics by inverting the water-in-oil emulsion which normally exists in the stream as it is produced from well(s) 10. That is, the stream will have substantial amounts of water (e.g. up to 30% or more by volume) wherein the discontinuous phase (water) is trapped within the continuous phase (heavy oil). In the present invention, a sufficient amount of additional water is deliberately added to the production stream in order to convert or invert the emulsion even though this additional water must ultimately be removed from the oil.

Referring to FIG. 3, a liquid/liquid heavy crude oil stream is produced from well(s) 10 through production manifold 75. Typically, a heavy crude oil stream of the type to be processed with the present invention is from about 60–90% heavy crude and about 10–40% water with the oil being the continuous phase of the emulsion. Water from line 76 is added to the production stream in line 75 in an amount sufficient to invert the emulsion into one in which the water will form the continuous phase with the oil becoming the discontinuous phase.

Figure 5:
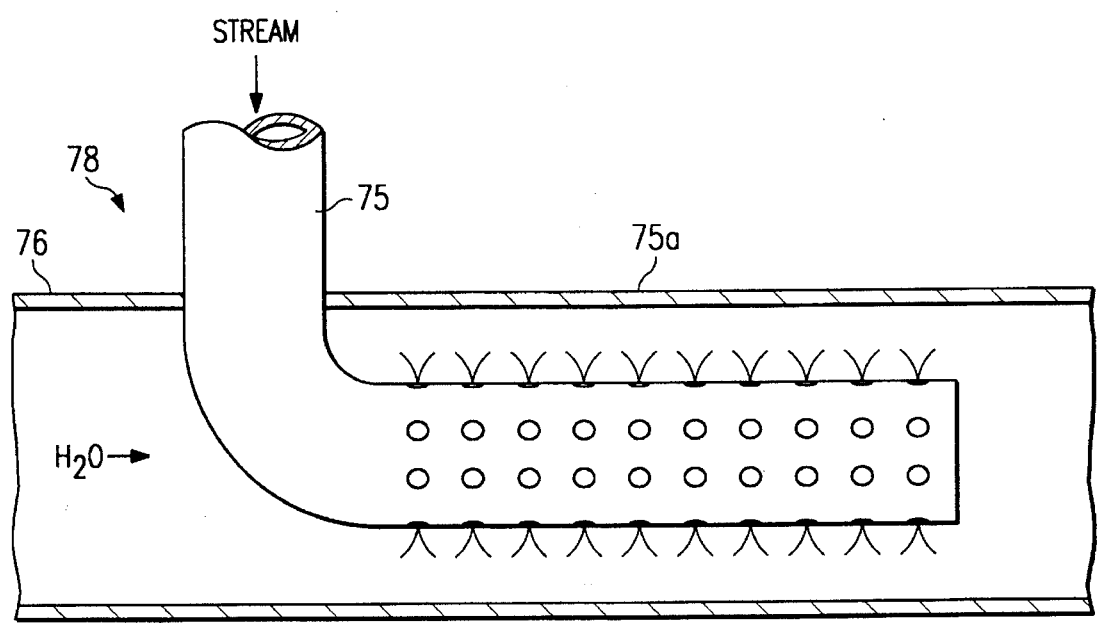
FIG. 5 is a cross-sectional view of a typical diffuser useful in the present invention.

While this additional water can be mixed with the oil stream by any means, preferably the crude oil stream is diffused into the additional water through a diffuser or the like, e.g. see FIG. 5 for the details of a simple diffuser 78 which can be used for this purpose. The reason why it is preferred to add the "oil" to the "water" is that it has been found that when water is added to the oil stream, the inversion point at which the emulsion becomes water external occurs at about 70% water while the inversion point occurs at only 53% water when the oil is added to the water. With some particular heavy crudes (e.g. Mayan crudes), this inversion may occur with about 46% water in the emulsion.

Accordingly, some water continuous emulsions can be maintained with about 50% of slightly less water when adding the oil to the water but may require about 70% or more water when adding the water to the oil. For example, depending on the heavy crude involver, a typical 10,000 barrels/day production stream with a 10% water content would require approximately 20,000 barrels/day of recycle water to invert the emulsion in the stream if water was added to the stream. Conversely, if the oil stream is added to the additional water, a continuous water phase can be maintained with only about 8,000 barrels/day of recycle water.

After sufficient water (more than 50% by volume) is present in the production stream, the stream is passed through a mixer (preferably a static or kinetics-type mixer 79, e.g. "Kenics" high-shear, low turbulence mixer) to ensure that the now continuous water phase is able to contact all water droplets contained within the oil globules. The stream flows through mixer 79, through gas knockout 80 (which may be optional), and into primary hydrocyclone 81. In water-external streams such as the treated stream in FIG. 3, the water content in the stream can be reduced by approximately one order of magnitude (reduced from about 85% to 10% or less) upon a single pass through primary hydrocyclone 81. The processing of the stream from this point in FIG. 3 is basically the same as that described above in relation to the process of FIG. 2.

That is, primary hydrocyclone 81 is operated at a split ratio to maximize the amount of water which will be separated from the stream and removed through the underflow 82 of the hydrocyclone. The overflow 83 from primary hydrocyclone 81 is comprised of heavy crude oil having a significantly reduced but still substantial water contaminant remaining therein. The stream in overflow 83 is heated further by passing it through heat exchangers 84 and 85. The stream flows from the heat exchanger 85, through a gas knockout vessel 86 (also may be optional) and into a secondary hydrocyclone 87 where the liquid/liquid stream is further separated.

The underflow 89 of hydrocyclone 87 (i.e. water with small amount of oil contaminant) is combined with underflow 82 of primary hydrocyclone 81 and is passed therewith through the de-sander 90 to remove any particulate material through underflow 91. The majority of overflow 92 from desander 90 is heated by fired heater 93 after which, a portion thereof may be flowed through heater exchanger 85 to heat the stream in overflow 83 prior to being returned through line 76 to provide at least a part of the recycled water necessary to invert the emulsion in the original production stream. The other portion of overflow 92 amounting to the net well water production and any oil contaminant (water which is removed from system) is diverted through line 94 through deoiler hydrocyclone 95.

The underflow 96 from hydrocyclone 95 is passed through a "polishing" hydrocyclone before the overflow 97 is disposed of to produced water tank 60. A biocide of the like from tank 99 can be added to the water, if desired. The overflow 100 from deoiler 95 (water with any remaining oil) is returned to line 76 to supply at least a portion of the water necessary to invert the emulsion in the original production stream.

The overflow 88 of secondary hydrocyclone 87 (e.g. crude oil meeting pipeline and/or sales specs—less than about 3% water—) is passed through flash drum stablizer 64 or the like to remove any substantial remaining gas before it is cooled by passing the crude oil product through line 70, through heat exchanger 84, cooler 13a, and on to product tank 66 or other storage or transporation. Gas is collected from (a) casing gas manifold 70, (b) optional gas knockouts 80, 86, (c) flash drum 64 and is disposed by any acceptable means, e.g. flare 71, fuel for heater 93, etc. By inverting the water-in-oil emulsion existing in the original production stream, hydrocyclones can be used as both the primary and secondary means for dehydrating the crude thereby eliminating the need for the more expensive, conventional equipment previously required.

A simplified dehydration process similar to that of FIG. 3 is illustrated in FIG. 4. A heavy crude oil stream is produced from well(s) 10 through production manifold 75. Water is added to the stream via diffuser 78 and the stream is then passed through mixer 79 as before. The stream is then passed through a primary hydrocyclone 81a where the oil plus its water contaminant is removed through overflow 83 while water plus its oil contaminant is removed through underflow 82. The overflow is taken to a stablization tower or column 105 which has a water side-draw system 106 which removes substantially all of the water from the oil. Any gas is removed overhead through line 107 while the oil is removed from the bottom line 108. A portion of the bottoms is heated in heater 109 and returned to column 105 while the remainder is passed on to storage tank 66 or a pipeline for transportation.

The water from side-draw system 106 and the underflow from hydrocyclone 81a is passed through a line 110, deoiler hydrocyclone 111 which is operated at a split ratio which produces a substantial amount of water in overflow 112. This water (and any oil) is returned to line 76 to provide at least a portion (e.g. a major portion) of the water necessary to invert the original emulsion in the production stream. The underflow 113 from deoiler 111 is passed through a polishing/desanding hydrocyclone 114 before the water is stored in tank 60.

Primary hydrocyclone 81a is operated in a manner (i.e. split ratio) to minimize the amount of water to the overflow while hydrocyclone 111 is operated to provide recycle water for inverting the emulsion in the production stream and very pure water for disposal.

What is claimed is:

1. A method for dehydrating a production liquid/liquid stream which is comprised of a heavy crude oil having a density equal to about 30° API or less and water wherein said heavy crude oil is the continuous phase and the water is the discontinuous phase, said method comprising the steps of:

initially treating said liquid/liquid stream by inverting the phases of said liquid/liquid stream by increasing the water content of said liquid/liquid stream until said water becomes the continuous phase and the heavy crude oil becomes the discontinuous phase to produce an inverted stream, wherein said step of initially treating excludes any treatment steps in which said heavy crude oil is separated from said water;

passing said inverted stream immediately following said step of initially treating through a first hydrocyclone to separate at least a significant portion of said water from said heavy crude oil of said inverted stream; and removing said heavy crude oil and any water contaminant through an overflow of said hydrocyclone; and removing the separated water and any oil contaminant through an underflow of said hydrocyclone.

2. The method of claim 1 wherein said phases are inverted by adding said liquid/liquid stream to water.

3. The method of claim 2 wherein at least a portion of said water to which said liquid/liquid stream is added is water that has been previously separated from said liquid/liquid stream.

4. The method of claim 3 wherein at least a portion of said previously separated water is heated before said liquid/liquid stream is added thereto.

5. The method of claim 4 wherein said portion of said removed water is heated directly by a heater.

6. The method of claim 5 wherein the water content of said liquid/liquid stream is increased to about 50% or more, by volume, of said liquid/liquid stream.

7. The method of claim 1 wherein said phases are inverted by adding water to said liquid/liquid stream.

8. The method of claim 1 wherein the amount of water in said liquid/liquid stream is reduced by about 50% or more, by volume, while passing through said first hydrocyclone.

9. The method of claim 1 including:

passing said heavy crude oil and its water contaminant from said overflow of said first hydrocyclone through a second hydrocyclone to further separate at least a portion of said water contaminant from said heavy crude oil;

removing said heavy crude oil with any still remaining water contaminant through an overflow of said second hydrocyclone; and removing the separated water contaminant with any remaining oil contaminant through an underflow of said second hydrocyclone.

10. The method of claim 9 wherein said water contaminant in said crude oil is reduced to less than about 3% by volume while passing through second hydrocyclone.

11. The method of claim 10 wherein said heavy crude oil with its remaining water contaminant is heated before passing through said second hydrocyclone.

12. The method of claim 1 including:

passing said heavy crude oil with its remaining water contaminant from said overflow of said first hydrocyclone through a stablization tower to further separate said at least a portion of said remaining water contaminant from said heavy crude oil;

removing said heavy crude oil with any remaining water contaminant through a first outlet from said stablization tower; and removing the separated water with any remaining oil contaminant through a second outlet from said stablization tower.

13. The method of claim 12 including;

returning at least a portion of said separated water with its remaining oil contaminant from said stablization tower to said liquid/liquid stream to supply at least part of the water used to invert the water-in-oil emulsion originally in said stream.

\* \* \* \* \*